United States Patent
Ukai et al.

(10) Patent No.: US 12,233,484 B2
(45) Date of Patent: Feb. 25, 2025

(54) FLUX AND SOLDER PASTE

(71) Applicant: Senju Metal Industry Co., Ltd., Tokyo (JP)

(72) Inventors: Ryuji Ukai, Tokyo (JP); Kazuya Kitazawa, Tokyo (JP); Hiroaki Kawamata, Tokyo (JP); Shinji Kikuchi, Tokyo (JP); Keisuke Shinozaki, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 17/914,495

(22) PCT Filed: Mar. 25, 2021

(86) PCT No.: PCT/JP2021/012462
§ 371 (c)(1),
(2) Date: Sep. 26, 2022

(87) PCT Pub. No.: WO2021/193797
PCT Pub. Date: Sep. 30, 2021

(65) Prior Publication Data
US 2023/0122883 A1    Apr. 20, 2023

(30) Foreign Application Priority Data

Mar. 27, 2020   (JP) .................................. 2020-058267

(51) Int. Cl.
*B23K 35/362* (2006.01)
*B23K 35/02* (2006.01)
*B23K 35/36* (2006.01)

(52) U.S. Cl.
CPC .......... *B23K 35/362* (2013.01); *B23K 35/025* (2013.01); *B23K 35/3612* (2013.01); *B23K 35/3613* (2013.01)

(58) Field of Classification Search
None
See application file for complete search history.

(56) References Cited

U.S. PATENT DOCUMENTS

| | | |
|---|---|---|
| 7,767,032 B2 | 8/2010 | Sheng et al. |
| 9,770,786 B2 | 9/2017 | Toyoda et al. |
| 10,857,630 B2 | 12/2020 | Takagi et al. |
| 11,117,224 B2 | 9/2021 | Kawanago et al. |
| 11,130,202 B2 | 9/2021 | Kawasaki et al. |
| 11,370,069 B2 | 6/2022 | Nonaka et al. |
| 2008/0000549 A1* | 1/2008 | Sheng ................ B23K 35/3612 148/23 |
| 2015/0059928 A1 | 3/2015 | Yamagame et al. |
| 2017/0355042 A1 | 12/2017 | Kakuishi et al. |
| 2020/0187363 A1 | 6/2020 | Furusawa |

FOREIGN PATENT DOCUMENTS

| | | | |
|---|---|---|---|
| CN | 1337294 A | 2/2002 | |
| CN | 102794582 A | 11/2012 | |
| CN | 104203492 A | 12/2014 | |
| CN | 104416297 A * | 3/2015 | ........... B23K 35/262 |
| CN | 109366041 A | 2/2019 | |
| CN | 110193684 A | 9/2019 | |
| CN | 110475644 A | 11/2019 | |
| CN | 110536771 A | 12/2019 | |
| JP | H10193176 A | 7/1998 | |
| JP | 201764758 A | 4/2017 | |
| JP | 201834190 A | 3/2018 | |
| JP | 2018161674 A | 10/2018 | |
| JP | 201942805 A | 3/2019 | |
| JP | 201969467 A | 5/2019 | |
| JP | 201984549 A | 6/2019 | |
| JP | 201993433 A | 6/2019 | |
| TW | 200812741 | 5/1996 | |
| TW | 201641207 A | 12/2016 | |
| TW | 201945330 A | 12/2019 | |
| WO | 2011151894 A1 | 12/2011 | |

OTHER PUBLICATIONS

Machine translation of CN 104416297A. (Year: 2015).*

* cited by examiner

*Primary Examiner* — Xiaowei Su
(74) *Attorney, Agent, or Firm* — The Webb Law Firm

(57) ABSTRACT

A flux for a solder paste includes rosin, an activator and a solvent. The solvent includes a monoalkylene glycol-based solvent and a solid solvent that is solid at 20° C. The total content of the monoalkylene glycol-based solvent and the solid solvent ranges from 40% by mass to 60% by mass with the total amount of the flux as 100%. The content of the solid solvent ranges from 5% by mass to 25% by mass with the total amount of the flux as 100%.

13 Claims, No Drawings

FLUX AND SOLDER PASTE

CROSS REFERENCE TO RELATED APPLICATIONS

This application is the United States national phase of International Application No. PCT/JP2021/012462, filed Mar. 25, 2021, and claims priority to Japanese Patent Application No. 2020-058267 filed Mar. 27, 2020, the disclosures of which are hereby incorporated by reference in their entirety.

BACKGROUND

Field

The present invention relates to a flux used for soldering and a solder paste using this flux.

Description of Related Art

In general, a flux used for soldering has properties of chemically removing metal oxides present in/on solder and the metal surface of an object to be bonded by the solder, and moving metal elements at the boundary therebetween. Hence, soldering using a flux can form intermetallic compounds between solder and the metal surface of an object to be bonded, thereby producing a strong joint.

A solder paste is a composite material obtained by mixing solder alloy powder and a flux. Soldering using a solder paste is performed by printing a solder paste on a soldering-target part such as an electrode on a substrate, mounting a component on the solder paste-printed soldering-target part, and heating the substrate in a heating oven called a reflow oven to melt the solder.

As a flux used in a solder paste, a flux containing an activator, rosin, a solvent and a thixotropic agent is known, and as the solvent, a diethylene glycol-based solvent, such as diethylene glycol monohexyl ether, is known to be used. (Refer to, for example, Patent Literature 1.)
Patent Literature 1: WO 2011/151894 A1

SUMMARY

If a solder paste in which a flux containing a diethylene glycol-based solvent as a solvent is mixed with metal powder is used for fine bonding, such as bump formation, an effect of void suppression can be obtained by selecting an activator, but in large-area bonding, such as die bonding mounting, the effect of void suppression cannot be obtained sufficiently.

The present invention has been conceived in order to solve such a problem(s), and objects thereof include providing a flux capable of suppressing void generation and a solder paste using the flux.

It has been found that a solder paste using a flux containing, as solvents, a monoalkylene glycol ether-based solvent and a solid solvent is capable of suppressing voids.

Hence, the present invention is a flux containing rosin, an activator and a solvent, wherein the solvent includes a monoalkylene glycol-based solvent and a solid solvent that is solid at 20° C., wherein the total content of the monoalkylene glycol-based solvent and the solid solvent ranges from 40% by mass to 60% by mass with the total amount of the flux as 100, and wherein the content of the solid solvent ranges from 5% by mass to 25% by mass.

It is preferable that in the flux of the present invention, the content of the monoalkylene glycol-based solvent range from 20% by mass to 50% by mass. Further, it is preferable that the monoalkylene glycol-based solvent have a boiling point of 200° C. or higher. Further, it is preferable that the monoalkylene glycol-based solvent be a monoethylene glycol-based solvent having one ethylene group, a monopropylene glycol-based solvent having one propylene group.

Further, the solvent may include, in addition to the monoalkylene glycol-based solvent and the solid solvent, a low boiling point solvent having a boiling point of lower than 200° C. It is preferable that the flux of the present invention contain 5% by mass to 15% by mass of the low boiling point solvent and 5% by mass to 15% by mass of another solvent other than the monoalkylene glycol-based solvent, the solid solvent and the low boiling point solvent. Further, it is preferable that the content of the rosin range from 10% by mass to 50% by mass.

It is preferable that the activator be one kind or two or more kinds of one of an organic acid, a halogen compound and an amine hydrohalide, or any combination of the organic acid, the halogen compound and the amine hydrohalide, and as the content of the activator, (i) the content of the organic acid range from 1% by mass to 5% by mass, (ii) the content of the halogen compound or the amine hydrohalide or the total content of the halogen compound and the amine hydrohalide range from 1% by mass to 5% by mass, or (iii) the total content of the organic acid, the halogen compound and the amine hydrohalide range from 1% by mass to 10% by mass.

Further, the flux of the present invention may further contain a thixotropic agent, and also may further contain an amine. It is preferable that in the flux of the present invention, the content of the thixotropic agent range from 1% by mass to 10% by mass, and the content of the amine range from 1% by mass to 5% by mass.

Further, the present invention is a solder paste containing the above flux and metal powder.

The flux of the present invention is a flux containing rosin, an activator and a solvent, wherein the solvent includes a monoalkylene glycol-based solvent and a solid solvent, wherein the total content of the monoalkylene glycol-based solvent and the solid solvent ranges from 40% by mass to 60% by mass with the total amount of the flux as 100, and wherein the content of the solid solvent ranges from 5% by mass to 25% by mass. Soldering in a reflow oven using a solder paste containing this flux and metal powder can suppress void generation, and also suppress hot slump and improve tackiness (holding force).

DETAILED DESCRIPTION

Examples of Flux of Embodiment

A flux of an embodiment contains rosin, an activator and a solvent, and the solvent includes a monoalkylene glycol-based solvent and a solid solvent that is solid at 20° C. The total content of the monoalkylene glycol-based solvent and the solid solvent ranges from 40% by mass to 60% by mass with the total amount of the flux as 100.

Soldering in a reflow oven using a solder paste containing this flux and metal powder can suppress void generation, and also suppress hot slump and improve tackiness.

Examples of monoalkylene glycol-based solvents include monoethylene glycol-based solvents each having one ethylene group represented by $-CH_2CH_2-$ and monopropylene glycol-based solvents each having one propylene group represented by —CH(CH$_3$)CH$_2$—. Examples of monoethylene glycol-based solvents include ethylene glycol monophenyl ether, ethylene glycol monohexyl ether, and ethylene glycol mono-2-ethylhexyl ether. Examples of monopropylene glycol-based solvents include propylene glycol monophenyl ether.

The monoalkylene glycol-based solvent is an essential additive component in the flux of this embodiment that suppresses void generation, and one kind or two or more kinds thereof can be used. The content of the monoalkylene glycol-based solvent ranges from 20% by mass to 50% by mass with the total amount of the flux as 100, wherein the total content of the monoalkylene glycol-based solvent and the solid solvent falls in the abovementioned range.

Examples of solid solvents include 2,5-dimethyl-2,5-hexanediol, neopentyl glycol (2,2-dimethyl-1,3-propanediol), dioxane glycol, 2,5-dimethyl-3-hexyne-2,5-diol, 2,3-dimethyl-2,3-butanediol, 2,2'-oxybis(methylene)bis(2-ethyl-1,3-propanediol), 2,2-bis(hydroxymethyl)-1,3-propanediol, and 1,1,1-tris(hydroxymethyl)propane.

The solid solvent is an essential additive component in the flux of this embodiment that suppresses void generation, and one kind or two or more kinds thereof can be used. The content of the solid solvent ranges from 5% by mass to 25% by mass with the total amount of the flux as 100, wherein the total content of the monoalkylene glycol-based solvent and the solid solvent falls in the abovementioned range.

Examples of rosin include raw rosin, such as gum rosin, wood rosin and tall oil rosin, and derivatives obtained from such raw rosin. Examples of the derivatives include purified rosin, hydrogenated rosin, disproportionated rosin, polymerized rosin, acid-modified rosin, phenol-modified rosin, α,β unsaturated carboxylic acid-modified products (acrylated rosin, maleated rosin, fumarated rosin, etc.), purified products, hydrogenated products and disproportionated products of polymerized rosin, and purified products, hydrogenated products and disproportionated products of α,β unsaturated carboxylic acid-modified products.

The rosin is an essential additive component in the flux of this embodiment that suppresses void generation, and one kind or two or more kinds thereof can be used. It is preferable that the content of the rosin range from 10% by mass to 50% by mass with the total amount of the flux as 100.

Examples of activators includes organic acids and halogens, and examples of halogens include halogen compounds and amine hydrohalides.

Examples of organic acids include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, terephthalic acid, dodecanedioic acid, parahydroxyphenyl acetic acid, picolinic acid, phenyl succinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl) butanoic acid, 2,3-dihydroxybenzoic acid, 2,4-diethylglutaric acid, 2-quinolinecarboxylic acid, 3-hydroxybenzoic acid, malic acid, p-anisic acid, stearic acid, 12-hydroxystearic acid, oleic acid, linoleic acid, and linolenic acid.

Examples of halogen compounds include 1-bromo-2-propanol, 3-bromo-1-propanol, 3-bromo-1,2-propanediol, 1-bromo-2-butanol, 1,3-dibromo-2-propanol, 2,3-dibromo-1-propanol, 1,4-dibromo-2-butanol, 2,3-dibromo-1,4-butanediol, and trans-2,3-dibromo-2-butene-1,4-diol.

Amine hydrohalides are each a compound of an amine and a hydrogen halide reacted, and examples thereof include aniline hydrogen chlorides and aniline hydrogen bromides. Examples of amines in amine hydrohalides include ethylamine, ethylenediamine, triethylamine, methylimidazole, 2-ethyl-4-methylimidazole, and 1,3-diphenylguanidine, and examples of hydrogen halides therein include hydrogenated products of chlorine, bromine, iodine and fluorine (hydrogen chloride, hydrogen bromide, hydrogen iodide and hydrogen fluoride). Examples of such amine hydrohalides include stearylamine hydrochloride, diethylaniline hydrochloride, diethanolamine hydrochloride, 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, dimethylamine hydrochloride, rosinamine hydrobromide, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, monoethylamine hydrochloride, monoethylamine hydrobromide, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosineamine hydrobromide, 2-phenylimidazole hydrobromide, 4-benzylpyridine hydrobromide, L-glutamic acid hydrochloride, N-methylmorpholine hydrochloride, betaine hydrochloride, 2-pipecoline hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosinamine hydrofluoride, cyclohexylamine tetrafluoroborate, and dicyclohexylamine tetrafluoroborate. Instead of or in addition to an amine hydrohalide(s), a borofluoride(s) may be contained. Examples of borofluorides include hydrofluoboric acid.

The activator is an essential additive component in the flux of this embodiment that suppresses void generation, and one kind or two or more kinds of one of organic acid, halogen compound and amine hydrohalide or any combination of organic acid, halogen compound and amine hydrohalide can be used. It is preferable that as the content of the activator, with the total amount of the flux as 100, (i) the content of an organic acid(s) range from 1% by mass to 5% by mass, or (ii) the content of a halogen compound(s) or an amine hydrohalide(s) or the total content of a halogen compound(s) and an amine hydrohalide(s) range from 1% by mass to 5% by mass. If organic acid, halogen compound and amine hydrohalide are used in combination, it is preferable that the total content of an organic acid(s) and a halogen compound(s), the total content of an organic acid(s) and an amine hydrohalide(s), or the total content of an organic acid(s), a halogen compound(s) and an amine hydrohalide(s) range from 1% by mass to 10% by mass.

The flux of this embodiment may contain an amine. Examples of amines include 1-amino-2-propanol, ethylamine, diethylamine, triethylamine, ethylenediamine, cyclohexylamine, 1,3-diphenylguanidine, 1,3-di-o-tolylguanidine, and 1-o-tolylbiguanide. Examples of amines also include alkanolamines, such as ethanolamine, 3-amino-1-propanol, 1-amino-2-propanol, diethanolamine, diisopropanolamine, triethanolamine, triisopropanolamine, N-(2-hydroxypropyl)ethylenediamine, N-(3-hydroxypropyl)ethylenediamine, N,N'-bis(2-hydroxypropyl)ethylenediamine, N,N'-bis(3-hydroxypropyl)ethylenediamine, N,N,N',N'-tetrakis(2-hydroxypropyl)ethylenediamine, and N,N,N',N'-tetrakis(3-hydroxypropyl)ethylenediamine.

The amine is an optional additive component in the flux of this embodiment that suppresses void generation, and one kind or two or more kinds thereof can be used. It is preferable that the content of the amine range from 1% by mass to 5% by mass with the total amount of the flux as 100.

The flux of this embodiment may contain a thixotropic agent. Examples of thixotropic agents include wax-based thixotropic agents and amide-based thixotropic agents. Examples of wax-based thixotropic agents include hardened castor oil. Examples of amide-based thixotropic agents include lauramide, palmitamide, stearamide, behenamide, hydroxystearamide, saturated fatty acid amide, oleic acid amide, erucic acid amide, unsaturated fatty acid amide, p-toluene methane amide, aromatic amide, methylene-bis-stearamide, ethylene-bis-lauramide, ethylene-bis-hydroxystearamide, saturated fatty acid bisamide, methylene-bis-oleamide, unsaturated fatty acid bisamide, m-xylylene bisstearamide, aromatic bisamide, saturated fatty acid polyamide, unsaturated fatty acid polyamide, aromatic polyamide, substituted amide, methylol stearamide, methylol amide, and fatty acid ester amide.

The thixotropic agent is an optional additive component in the flux of this embodiment that suppresses void generation, and one kind or two or more kinds thereof can be used. It is preferable that the content of the thixotropic agent range from 1% by mass to 10% by mass with the total amount of the flux as 100.

The flux of this embodiment may contain a low boiling point solvent having a boiling point of lower than 200° C. as a solvent other than the monoalkylene glycol-based solvent and the solid solvent. Examples of low boiling point solvents include 2-methyl-2,4-pentanediol, isopropyl alcohol, 1,2-butanediol, 2,4-diethyl-1,5-pentanediol, 1,2,6-trihydroxy-hexane, 1-ethynyl-1-cyclohexanol, and 1,4-cyclohexanediol.

The low boiling point solvent is an optional additive component in the flux of this embodiment that suppresses void generation, and one kind or two or more kinds thereof can be used. It is preferable that the content of the low boiling point solvent range from 5% by mass to 15% by mass with the total amount of the flux as 100.

The flux of this embodiment may contain another solvent, other than the monoalkylene glycol-based solvent, the solid solvent and the low boiling point solvent. Examples of other solvents (another solvent) include alcohol-based solvents, other glycol ether-based solvents, and terpineols. Examples of alcohol-based solvents include isobornylcyclohexanol. Examples of glycol ether-based solvents include diethylene glycol mono-2-ethylhexyl ether, diethylene glycol monohexyl ether, diethylene glycol dibutyl ether, triethylene glycol monobutyl ether, methylpropylene triglycol, butylpropylene triglycol, triethylene glycol butyl methyl ether, and tetraethylene glycol dimethyl ether.

The other solvent (another solvent) is an optional additive component in the flux of this embodiment that suppresses void generation, and one kind or two or more kinds thereof can be used. It is preferable that the content of the other solvent range from 5% by mass to 15% by mass with the total amount of the flux as 100.

Examples of Solder Paste of Embodiment

A solder paste of an embodiment contains the above flux and metal powder. The metal powder is made of solder powder of Sn alone, or a Sn—Ag-based alloy, a Sn—Cu-based alloy, a Sn—Ag—Cu-based alloy, a Sn—Bi-based alloy, a Sn—In-based alloy, a Sn—Pb-based alloy or the like, or any of these alloys with Sb, Bi, In, Cu, Zn, As, Ag, Cd, Fe, Ni, Co, Au, Ge, P or the like added. The metal powder may be Pb-free solder.

Examples of Effects of Flux and Solder Paste of Embodiments

A flux containing rosin, an activator and a solvent, wherein the solvent includes a monoalkylene glycol-based solvent and a solid solvent, and wherein the total content of the monoalkylene glycol-based solvent and the solid solvent ranges from 40% by mass to 60% by mass with the total amount of the flux as 100 and a solder paste using this flux can suppress void generation, and also suppress hot slump and improve tackiness.

Examples

Fluxes of Examples and Comparative Examples were prepared with compositions shown in TABLE 1 below, and solder pastes were prepared using these fluxes and their void suppression, hot slump suppression and tackiness were tested. Composition ratios shown in TABLE 1 are expressed by percent by mass (% by mass) with the total amount of a flux as 100. The boiling point, surface tension and viscosity at 20° C. of each solvent used in Examples and Comparative Examples are shown in TABLE 2 below.

Each solder paste was made of 11% by mass of a flux and 89% by mass of metal powder. The metal powder in each solder paste was a Sn—Ag—Cu-based solder alloy made of 3.0% by mass of Ag, 0.5% by mass of Cu and the rest being Sn. The particle size of the metal powder was 20 μm to 38 μm.

<Evaluation of Void Suppression>

(1) Testing Method

In order to evaluate void suppression, each of the solder pastes using the fluxes specified in Examples and Comparative Examples was printed on an electrode of a substrate. The printing thickness was 0.15 mm. After the solder-paste printing, a 6 mm×6 mm Si chip having a substrate-surface side plated with NiAu as a back metal was mounted thereon, and reflow was performed. The reflow conditions were as follows: after preheating at 150° C. to 180° C. for 35 seconds under a $N_2$ atmosphere having an oxygen concentration of 500 ppm, main heating at 220° C. or higher for 32 seconds with the peak temperature of 250° C. is performed. After the reflow, the component-mounted part was photographed with an X-ray observation device (XVR-160 manufactured by Uni-Hite System Cooperation), and a void area ratio was calculated using Formula (1) below, wherein the number of pixels of the entire electrode on the chip's lower surface in an X-ray transmission image is the denominator, and the total number of pixels of void portions is the numerator.

(Total Number of Pixels of Void Portions/Number of Pixels of Entire Electrode on Chip's Lower Surface)×100(%)　　(1)

(2) Criteria for Determination
A (double circle): Void Area Ratio of 5% or Lower
B (single circle): Void Area Ratio of Higher than 5% but 10% or Lower
C (cross mark): Void Area Ratio of Higher than 10%

<Evaluation of Hot Slump Suppression>
(1) Testing Method
Evaluation was made in accordance with a hot slump test of JIS Z 3284-3:2014. In the hot slump test, a stainless steel metal mask having printing parts formed using a predetermined pattern shown in FIG. 6 of JIS Z 3284-3:2014 was used to print each solder paste on a copper plate, and after the metal mask was removed, heating at 150° C. for 10 minutes was performed. Then, hot slump of each solder paste was expressed in numbers.
(2) Criteria for Determination
The minimum interval at which droplets of each solder paste printed using the metal mask were not united after heating was used to determine hot slump.
B (single circle): Result of Hot Slump Test: 0.9 mm or less
C (cross mark): Result of Hot Slump Test: 1.0 mm or more <Evaluation of Tackiness>
(1) Testing Method
Evaluation was made in accordance with a tackiness test of JIS Z 3284-3:2014. For the tackiness test, a tackiness tester TAC-II manufactured by RHESCA Co. Ltd. was used.
(2) Criteria for Determination
B (single circle): Tackiness≥1 N
C (cross mark): Tackiness<1 N

TABLE 2

| | | Surface Tension [mN/m] | Viscosity [mPa·s] | Boiling Point [° C.] |
|---|---|---|---|---|
| Monoalkylene Glycol | Ethylene Glycol Monophenyl Ether | 36.6 | 30.5 | 244.7 |
| | Propylene Glycol Monophenyl Ether | 37.8 | 23.2 | 242.7 |
| | Ethylene Glycol Monohexyl Ether | 24.5 | 2.3 | 208 |
| | Ethylene Glycol Mono-2-Ethylhexyl Ether | 24.4 | 7.6 | 229 |
| Another Solvent | Diethylene Glycol Monohexyl Ether | 26 | 8.6 | 259.1 |
| Low Boiling Point Solvent | 2-Methyl-2,4-Pentanediol | 28.7 | 34.4 | 197.7 |

According to the present invention, as shown in each of Examples 1 to 3, a flux thereof showed sufficient effects of void suppression, hot slump suppression and tackiness, the flux containing, as a monoalkylene glycol-based solvent, ethylene glycol monophenyl ether, which is a monoethylene glycol-based solvent, in the range of 20% by mass to 50% by mass specified in the present invention, and containing, as a solid solvent, 2,5-dimethyl-2,5-hexanediol in the range of 5% by mass to 25% by mass specified in the present invention, wherein the total content of the monoethylene glycol-based solvent and the solid solvent was in the range of 40% by mass to 60% by mass specified in the present invention, wherein the flux further contained, as an activator, 2,2-bis(hydroxymethyl)propionic acid, which is an organic acid, in the range of 1% by mass to 5% by mass specified in the present invention, and contained as an activator, 1,3-diphenylguanidine hydrobromide, which is an amine hydrohalide, in the range of 1% by mass to 5% by mass specified in the present invention, wherein the total content of the

TABLE 1

| | | *1-1 | *1-2 | *1-3 | *1-4 | *1-5 | *1-6 | *1-7 | *1-8 | *1-3 | *2-1 | *2-2 | *2-3 | *2-4 | *2-5 |
|---|---|---|---|---|---|---|---|---|---|---|---|---|---|---|---|
| Rosin | Polymerized Rosin | 38 | 38 | 30 | 38 | 38 | 38 | 38 | 38 | 38 | 38 | 25 | 35 | 38 | 38 |
| Activator (Organic Acid) | Adipic Acid | | | | | | | | | 3 | | | | | |
| | 2,2-Bis(Hydroxymethyl) Propionic Acid | 3 | 3 | 3 | 3 | 3 | 3 | 3 | 3 | | 3 | 3 | 3 | 3 | 3 |
| Activator (Amine Hydrohelide) | Diphenylguanidine Hydrobromide | 2 | 2 | 2 | 2 | 2 | 2 | 2 | 2 | 2 | 2 | 2 | 2 | 2 | 2 |
| Thixotropic Agent | Hardened Castor Oil | 5 | 5 | 5 | 5 | 5 | 5 | 5 | 5 | 5 | 5 | 5 | 5 | 5 | 5 |
| Amine | 1-Amino-2-Propanol | 2 | 2 | | 2 | 2 | 2 | 2 | 2 | 2 | 2 | 2 | 2 | 2 | 2 |
| Monoalkylene Glycol-based Solvent | Ethylene Glycol Monophenyl Ether | 25 | 45 | 50 | | | | 30 | 30 | 40 | 20 | 55 | 45 | | 50 |
| | Propylene Glycol Monophenyl Ether | | | | 40 | | | | | | | | | | |
| | Ethylene Glycol Monohexyl Ether | | | | | 40 | | | | | | | | | |
| | Ethylene Glycol Mono-2-Ethylhexyl Ether | | | | | | 40 | | | | | | | | |
| Another Solvent | Diethylene Glycol Monohexyl Ether | | | | | | | 10 | | | | | 5 | 40 | |
| Low Boiling Point Solvent | 2-Methyl-2,4-Pentanediol | | | | | | | | 10 | | | | | | |
| Solid Solvent | 2,5-Dimethyl-2,5-Hexanediol | 25 | 5 | 10 | 10 | 10 | 10 | 10 | 10 | 10 | 30 | 8 | 3 | 10 | |
| Total Content | | 100 | 100 | 100 | 100 | 100 | 100 | 100 | 100 | 100 | 100 | 100 | 100 | 100 | 100 |
| Evaluation | Void | A | A | A | A | A | A | B | B | A | B | C | B | C | B |
| | Hot Slump | B | B | B | B | B | B | B | B | B | B | C | C | B | C |
| | Tackiness | B | B | B | B | B | B | B | B | B | C | B | B | B | B |

*1: Example
*2: Comparative Example
A = Double Circle,
B = Single Circle,
C = Cross Mark organic acid, a halogen compound and the amine hydrohalide was in the range of 1% by mass to 10% by mass specified in the present invention, and wherein the flux further contained, as rosin, polymerized rosin in the range of 10% by mass to 50% by mass specified in the present invention. Although the flux further contained an amine and/or a thixotropic agent in their respective ranges specified in the present invention, the effects due to the flux containing the monoalkylene glycol-based solvent and the solid solvent were not inhibited.

Further, as shown in Example 4, a flux containing, as a monoalkylene glycol-based solvent, propylene glycol monophenyl ether, which is a monopropylene glycol-based solvent, in the range of 20% by mass to 50% by mass specified in the present invention, and as shown in Example 5 or Example 6, a flux containing, as a monoalkylene glycol-based solvent, ethylene glycol monohexyl ether or ethylene glycol mono-2-ethylhexyl ether, which is another kind of monoethylene glycol-based solvent, in the range of 20% by mass to 50% by mass specified in the present invention also showed sufficient effects of void suppression, hot slump suppression and tackiness.

Further, as shown in Example 7, a flux containing, as another solvent, diethylene glycol monohexyl ether in the range of 5% by mass to 15% by mass specified in the present invention also showed sufficient effects of void suppression, hot slump suppression and tackiness thanks to the flux containing, as a monoalkylene glycol-based solvent, ethylene glycol monophenyl ether, which is a monoethylene glycol-based solvent, in the range of 20% by mass to 50% by mass specified in the present invention.

Further, as shown in Example 8, a flux containing, as a low boiling point solvent, 2-methyl-2,4-pentanediol in the range of 5% by mass to 15% by mass specified in the present invention also showed sufficient effects of void suppression, hot slump suppression and tackiness thanks to the flux containing, as a monoalkylene glycol-based solvent, ethylene glycol monophenyl ether, which is a monoethylene glycol-based solvent, in the range of 20% by mass to 50% by mass specified in the present invention.

Further, as shown in Example 9, a flux containing, as an organic acid, an adipic acid, which is another kind of organic acid, in the range of 1% by mass to 5% by mass specified in the present invention also showed sufficient effects of void suppression, hot slump suppression and tackiness.

In contrast, as shown in Comparative Example 1, a flux containing, as a monoalkylene glycol-based solvent, ethylene glycol monophenyl ether, which is a monoethylene glycol-based solvent, in the range specified in the present invention, but containing, as a solid solvent, 2,5-dimethyl-2,5-hexanediol beyond (above) the range specified in the present invention showed effects of void suppression and hot slump suppression, but did not show an effect of tackiness although the total content of the monoethylene glycol-based solvent and the solid solvent was in the range specified in the present invention.

Further, as shown in Comparative Example 2, a flux containing, as a solid solvent, 2,5-dimethyl-2,5-hexanediol in the range specified in the present invention, but containing, as a monoalkylene glycol-based solvent, ethylene glycol monophenyl ether, which is a monoethylene glycol-based solvent, beyond (above) the range specified in the present invention, wherein the total content of the monoethylene glycol-based solvent and the solid solvent was beyond (above) the range specified in the present invention showed an effect of tackiness, but did not show effects of void suppression and hot slump suppression.

Further, as shown in Comparative Example 3, a flux containing, as a monoalkylene glycol-based solvent, ethylene glycol monophenyl ether, which is a monoethylene glycol-based solvent, in the range specified in the present invention, but containing, as a solid solvent, 2,5-dimethyl-2,5-hexanediol below the range specified in the present invention showed effects of void suppression and tackiness, but did not show an effect of hot slump suppression although the total content of the monoethylene glycol-based solvent and the solid solvent was in the range specified in the present invention.

Further, as shown in Comparative Example 4, a flux containing, as a solid solvent, 2,5-dimethyl-2,5-hexanediol in the range specified in the present invention, but not containing a monoalkylene glycol-based solvent and containing diethylene glycol monohexyl ether, which is another solvent, in the range specified for a monoalkylene glycol-based solvent showed effects of hot slump suppression and tackiness, but did not show an effect of void suppression.

Further, as shown in Comparative Example 5, a flux containing, as a monoalkylene glycol-based solvent, ethylene glycol monophenyl ether, which is a monoethylene glycol-based solvent, in the range specified in the present invention, but not containing a solid solvent showed effects of void suppression and tackiness, but did not show an effect of hot slump suppression.

It has been believed that a solvent having a boiling point of 200° C. or higher, the solvent being contained in a flux, allows the solvent to remain in a temperature range expected at soldering and can suppress deactivation of an activator. It has also been believed that a solvent having a surface tension of 30 mN/m or more allows the solvent to easily move through gaps in powder and can prevent, during solder melting, gasified components from staying in solder. It has also been believed that a solvent having a viscosity at 20° C. of 25 mPa-s or more can increase the amount of solder in a solder paste and accordingly reduce the amount of flux residuals and therefore can prevent these from staying in molten solder.

As shown in TABLE 2, diethylene glycol monohexyl ether, which is not a monoalkylene glycol-based solvent but another solvent, in Comparative Example 4 has a boiling point that falls in the above range that has been considered preferable, but its surface tension and viscosity at 20° C. do not fall in the above ranges that have been considered preferable. The flux thereof containing diethylene glycol monohexyl ether and a solid solvent did not show an effect of void suppression, although the content of the diethylene glycol monohexyl ether was in the range specified for a monoalkylene glycol-based solvent.

In contrast, not only the flux of each of Example 1 and so forth containing ethylene glycol monophenyl ether, whose boiling point, surface tension and viscosity at 20° C. fall in the above ranges that have been considered preferable, but also the flux of Example 4 containing propylene glycol monophenyl ether, whose viscosity does not fall in the above range that has been considered preferable, and the flux of Example 5 containing ethylene glycol monohexyl ether and the flux of Example 6 containing ethylene glycol mono-2-ethylhexyl ether, whose surface tensions and viscosities, as with diethylene glycol monohexyl ether in Comparative Example 4, do not fall in the above ranges that have been considered preferable, showed sufficient effects of void suppression, hot slump suppression and tackiness thanks to the fluxes containing their respective monoalkylene glycol-based solvents in the range specified therefor.

Thus, it is preferable that the boiling point of the monoalkylene glycol-based solvent be 200° C. or higher. Further, it is preferable that the surface tension of the monoalkylene glycol-based solvent be 23 mN/m or more. Still further, it is preferable that the viscosity at 20° C. of the monoalkylene glycol-based solvent be 2 mPa-s or more.

Thus, (i) a flux of the present invention containing rosin, an activator and a solvent, wherein the solvent includes a monoalkylene glycol-based solvent and a solid solvent, and wherein the total content of the monoalkylene glycol-based solvent and the solid solvent ranges from 40% by mass to 60% by mass with the total amount of the flux as 100 and (ii) a solder paste using this flux can suppress void generation, and have the effects that are unable to be obtained by a combination of a solid solvent and a conventional solvent.

Further, the flux of the present invention containing any one or combination of an organic acid and a halogen as the activator and further containing a thixotropic agent and/or an amine do not inhibit void suppression, hot slump suppression and tackiness obtained by the flux containing the monoalkylene glycol-based solvent and the solid solvent, and hence has sufficient effects thereof.

The invention claimed is:

1. A flux for a solder paste comprising: rosin; an activator; and a solvent,
    wherein the solvent includes a monoalkylene glycol-based solvent and a solid solvent that is solid at 20° C.,
    wherein a total content of the monoalkylene glycol-based solvent and the solid solvent ranges from 40% by mass to 60% by mass with a total amount of the flux as 100%,
    wherein a content of the solid solvent ranges from 5% by mass to 25% by mass with the total amount of the flux as 100%,
    wherein a content of the rosin ranges from 38% by mass to 50% by mass with the total amount of the flux as 100%, and
    wherein the solid solvent is selected from the group consisting of: 2,5-dimethyl-2,5-hexanediol, dioxane glycol, 2,5-dimethyl-3-hexyne-2,5-diol, 2,3-dimethyl-2,3-butanediol, 2,2'-oxybis(methylene)bis(2-ethyl-1,3-propanediol), 2,2-bis(hydroxymethyl)-1,3-propanediol, 1,1,1-tris(hydroxymethyl) propane, and combinations thereof.

2. The flux for a solder paste according to claim 1, wherein a content of the monoalkylene glycol-based solvent ranges from 20% by mass to 50% by mass with the total amount of the flux as 100%.

3. The flux for a solder paste according to claim 1, wherein the monoalkylene glycol-based solvent has a boiling point of 200° C. or higher.

4. The flux for a solder paste according to claim 1, wherein the monoalkylene glycol-based solvent is a monoethylene glycol-based solvent having one ethylene group or a monopropylene glycol-based solvent having one propylene group.

5. The flux for a solder paste according to claim 1, wherein the solvent includes, in addition to the monoalkylene glycol-based solvent and the solid solvent, a low boiling point solvent having a boiling point of lower than 200° C.

6. The flux for a solder paste according to claim 5, wherein a content of the low boiling point solvent ranges from 5% by mass to 15% by mass with the total amount of the flux as 100%.

7. The flux for a solder paste according to claim 1, wherein the solvent includes, in addition to the monoalkylene glycol-based solvent and the solid solvent, another solvent a content of which ranges from 5% by mass to 15% by mass with the total amount of the flux as 100%.

8. The flux for a solder paste according to claim 1,
    wherein the activator is one kind or two or more kinds of one of an organic acid, a halogen compound and an amino hydrohalide, or any combination of the organic acid, the halogen compound and the amino hydrohalide, and
    wherein as a content of the activator, with the total amount of the flux as 100%, (i) a content of the organic acid ranges from 1% by mass to 5% by mass, (ii) a content of the halogen compound or the amino hydrohalide or a total content of the halogen compound and the amino hydrohalide ranges from 1% by mass to 5% by mass, or (iii) a total content of the organic acid, the halogen compound and the amino hydrohalide ranges from 2% by mass to 5% by mass.

9. The flux for a solder paste according to claim 1, further comprising a thixotropic agent.

10. The flux for a solder paste according to claim 9, wherein a content of the thixotropic agent ranges from 1% by mass to 10% by mass with the total amount of the flux as 100%.

11. The flux for a solder paste according to claim 1, further comprising an amine.

12. The flux for a solder paste according to claim 11, wherein a content of the amine ranges from 1% by mass to 5% by mass with the total amount of the flux as 100%.

13. A solder paste comprising:
    the flux according to claim 1; and
    metal powder.

* * * * *